Nov. 30, 1943. M. P. WINTHER 2,335,557
LUBRICATING SYSTEM
Filed July 3, 1942 2 Sheets-Sheet 1

Martin P. Winther,
Inventor.
Haynes and Koenig,
Attorneys.

Nov. 30, 1943.　　　M. P. WINTHER　　　2,335,557
LUBRICATING SYSTEM
Filed July 3, 1942　　　2 Sheets-Sheet 2

Martin P. Winther,
Inventor.
Haynes and Koenig,
Attorneys.

Patented Nov. 30, 1943

2,335,557

UNITED STATES PATENT OFFICE 2,335,557

LUBRICATING SYSTEM

Martin P. Winther, Waukegan, Ill., assignor to Martin P. Winther, as trustee

Application July 3, 1942, Serial No. 449,599

11 Claims. (Cl. 308—128)

This invention relates to lubricating systems, and with regard to certain more specific features to a lubricating system particularly for use on machines having supporting and pilot bearings.

Among the several objects of the invention may be noted the provision of a lubricating system which will continuously circulate lubricant serially through both a supporting bearing and a relatively inaccessible pilot bearing, such as are used in apparatus employing relatively rotary driving and driven members in a stationary frame; the provision of a lubricating system of the class described which repeatedly re-circulates a given charge of lubricant and which is so arranged that a portion of the charge is promptly available for lubrication upon starting; and the provision of a system of the class described which minimizes the number of special parts and which is reliable and simple in construction requiring but a minimum of attention. Other objects will be in part obvious and in part pointed out hereinafter.

The generic invention herein is described in two forms, one of which is adapted to the apparatus described in the Martin P. Winther copending United States patent application Serial No. 439,205, filed April 16, 1942, for Eddy-current coupling; and the other form of which is adapted to the apparatus described in the Martin P. Winther copending United States patent application Serial No. 333,313, filed May 4, 1940, for Electrical apparatus which eventuated into Patent 2,287,953, dated June 30, 1942. It is to be understood, however, that the invention is applicable to all similar apparatus presenting similar problems, which will be outlined hereinafter.

The invention accordingly comprises the elements and combinations of elements, features of construction, and arrangements of parts which will be exemplified in the structures hereinafter described, and the scope of the application of which will be indicated in the following claims.

Figure 1:
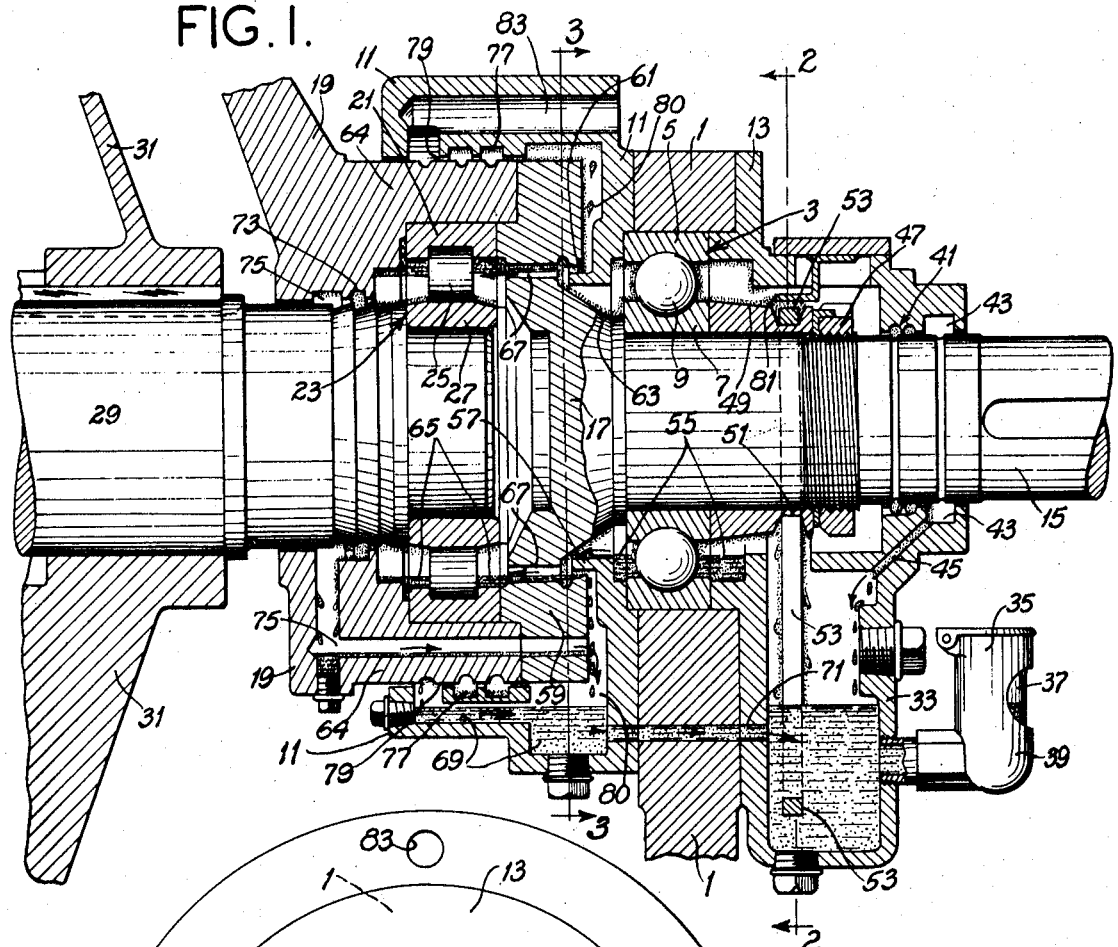
Figure 2:
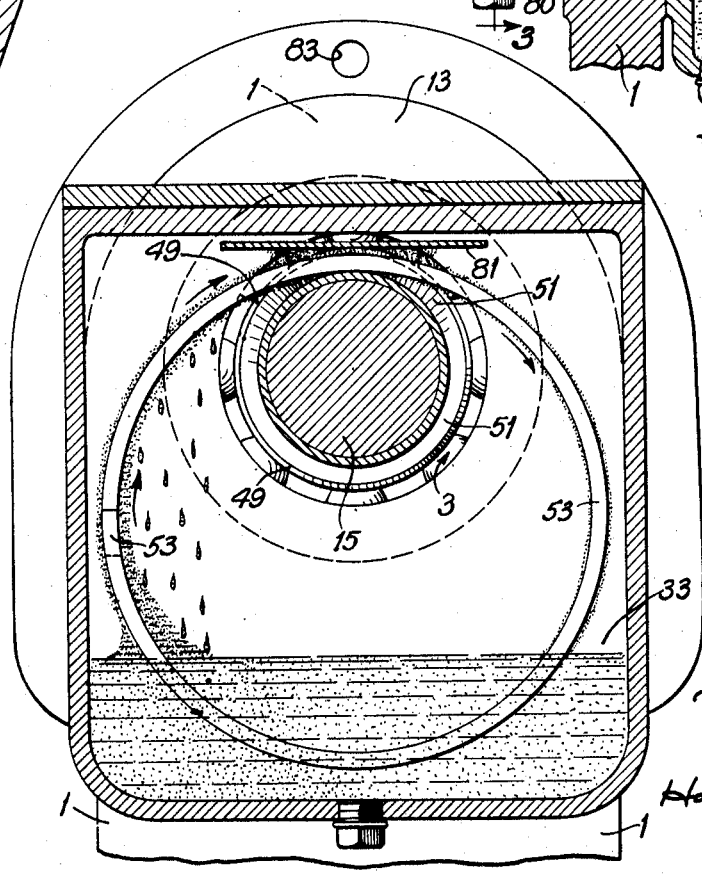
Figure 3:
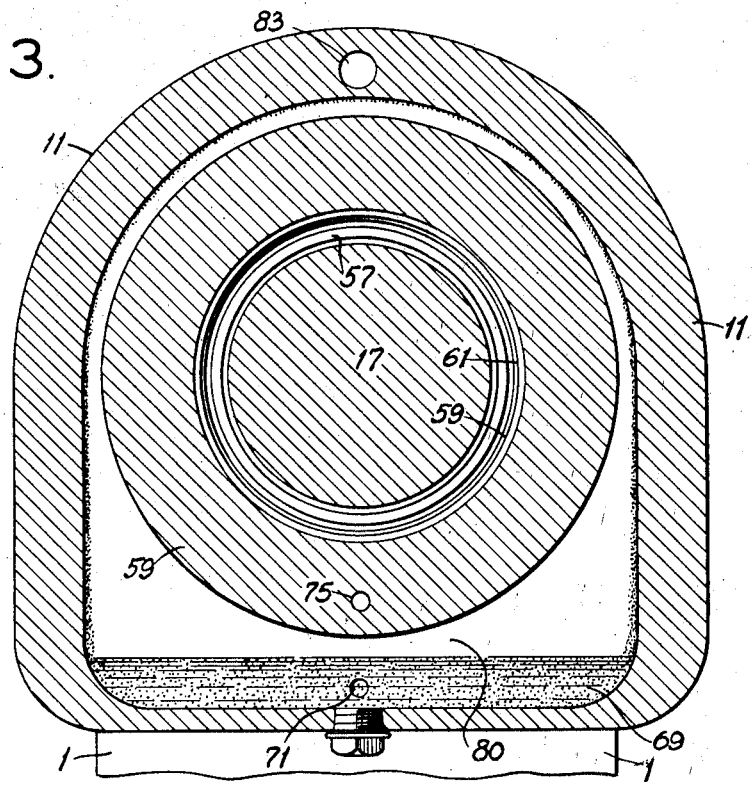
Figure 4:
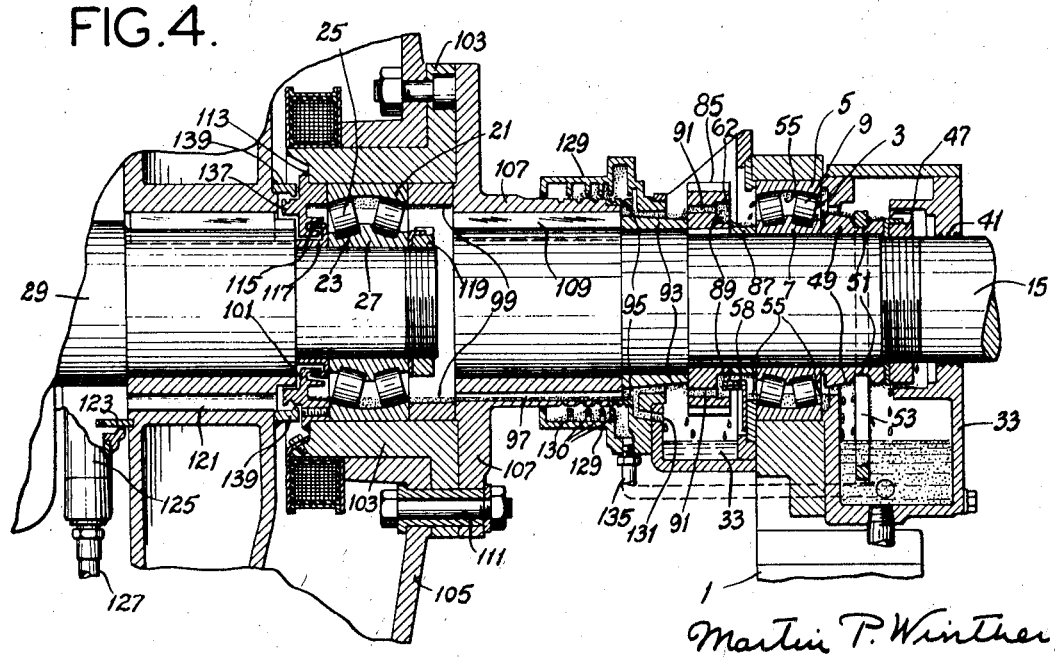

In the accompanying drawings, in which are illustrated two of various possible embodiments of the invention, Fig. 1 is a longitudinal section illustrating the new lubricating system, adapted to use on the construction shown in said application Serial No. 439,205;

Figs. 2 and 3 are cross sections on Fig. 1 taken on lines 2—2 and 3—3 respectively; and, Fig. 4 is a view similar to Fig. 1, showing the system adapted to use on the construction shown in said application Serial No. 333,313.

Similar reference characters indicate corresponding parts throughout the several views of the drawings, and stippling indicates oil or lubricant of a flowing nature.

Referring now more particularly to Fig. 1 (which illustrates the form of the invention applicable to said application Serial No. 439,205), there is shown at numeral 1 a stationary main bearing support or pedestal adjacent one end of the machine. In this support 1 is held a main bearing indicated generally by the numeral 3 and consisting of an outer stationary race 5, an inner rotary race 7, and anti-friction ball bearings 9. This main bearing 3 is held in axial position by stationary members 11 and 13, located on opposite sides of the pedestal 1.

The inner race 7 of the main bearing 3 is carried on, and acts as a rotary support for, a rotary shaft 15, the latter ordinarily, though not necessarily, operating as an input shaft at constant speed. This shaft 15 is of the stub variety with a flange 17 for supporting a rotary member 19 driven by the shaft. Between the members 17 and 19 is clamped the rotary outer race 21 of a pilot bearing 23. This pilot bearing 23 includes anti-friction rollers 25 and an inner rotary race 27 which is pressed on the end of a rotary shaft 29. The shaft 29 has keyed thereto a rotary member 31. As made clear in said application No. 439,205, there is an electromagnetic slip coupling between the members 19 and 31, not shown herein, whereby motion is transmitted, with slip, from the member 19 to the member 31. This in the present example makes shaft 29 a driven member.

The shaft 29 generally operates at a speed which is different from the speed of the shaft 15. This accounts for the necessity for the pilot bearing 23 between the shafts. Ordinarily, though not necessarily, the output shaft 29 operates at a variable speed, while input shaft 15 operates at constant speed.

From the above it will be seen that the members 1, 5, 11 and 13 are stationary; the parts 15, 17 and 19 are rotary together at one speed in the stationary member; and the parts 29, 31 are rotary at another speed both with respect to the stationary parts and said rotary parts 15, 17 and 19. Heretofore difficulty has been experienced in properly lubricating an organization of bearings such as 3 and 23, particularly where the apparatus is in continuous operation for long periods with heavy loads. One reason for this is the relative inaccessibility of the bearing 23 which is entirely enclosed from the outside by rotary members through which it is difficult to feed lubricant while the apparatus is in motion. Grease lubrication has been tried, but it has failed to be successful over long periods of operation, because in order to get grease into the bearing 23 the apparatus must be stopped, and grease will not continue to lubricate for long periods without replenishment. Ordinary methods of lubrication with lubricating oil have failed to provide proper continuous lubrication, and in addition have failed to provide lubricant consistently at the instant of starting.

The present invention solves the above difficulties. In the member 13 is formed a lubricant sump or pocket 33 having a lubricant inlet 35 organized with a sight glass 37 in a supply cup 39. Member 13 is formed as an enclosure around the input shaft 15, this enclosure being completed at the right by an oil seal or gland 41. Beyond this gland is a space 43 for catching any lubricant which leaks past the gland 41 and returning it to the sump 33 via a passage 45.

Clamping nut 47 threaded on shaft 15 and which holds the inner race 7 to the shaft also holds an oil feeding cone 49 grooved at its smaller end 51 for receiving a depending oil ring 53. This ring is large enough to hang down into the supply of liquid lubricant, part of which is carried in the sump 33. The ring 53 is kept in position within the groove 51 by a stationary finger 81 located just above the ring. This finger also collects lubricant for distribution to the groove 51 (see Fig. 2). The ring 53 is exemplary of various rotary members that may be suspended from the rotary shaft, such as for example a chain or wire or the like. All are intended to come under the head of a rotary suspended member for lifting oil.

Rotation of the shaft 15, by rolling contact in the groove 51, rotates the ring 53, thus to pick up oil from the sump and deliver it to the small end of the cone 49. From this point, the lubricant creeps by centrifugal force along the surface of the cone to the left and into the bearing 3, where it coats the inner and outer races 7 and 5, respectively, as well as the balls or rolling elements 9.

Lubricant thus pumped is in excess of the requirements of the bearing 3, and therefore an auxiliary stationary sump 55 is provided by properly shaping the parts 11 and 13 adjacent to the outer race 5 of said bearing 3. Thus excess lubricant runs down to be gathered at the bottom of the auxiliary sump 55 as indicated.

Beyond what may be called the inside (left side) of the bearing 3, the sump 55 is provided with an outlet lip 57 for excess lubricant. This lip is stationary, being a portion of the stationary part 11 and reaches axially into an inwardly directed flange or lip or dam on the flange rim 59. The inner edge of this flange rim 59 is directed inward, as indicated at 61, the hollow inside of the member 59 being recessed peripherally, so that any lubricant caught from the overflow 57 and behind flange 61 tends to spin outwardly and to be held by centrifugal force in the interior cup shape of the member 59. In addition the flange 17 is tapered as a cone, as indicated at 63, whereby some lubricant from the bearing 3 finds its way into the flange rim 59 by centrifugal action and creepage along the cone. The cone 63 in effect reaches to within the lip 61.

The rim 59 of flange 17 and the hub 64 of member 19 clamp and hold the outer race 21 of the bearing 23. These members 59 and 64 are thus formed as a second auxiliary and rotary sump 65 around the outer race 21, whereby centrifugally spun oil tends to be held in the members 21, 59 and 64. This floods the relatively moving rollers 25 and in part finds its way to the inner race 27. The oil passages 67 from the space behind the inwardly directed flange 61 to the bearing 23 are drilled.

In view of the above, it will be seen that lubricant from the auxiliary stationary sump 55 flows over the stationary lip 57 to a position behind rotary edge 61, as indicated. Thus it fills the rotary cup-shaped portion which contains the pilot bearing 23. This cup may be considered to extend from the oil seal 73 on one side of the bearing to the inwardly extending edge 61 on the other side, and thus includes the passages 67. Any excess oil in the cup 21, 59, 64 will flow by centrifugal force over the flange 61 and enter space 80. It then finds its way to sump 33 by way of passage 71.

As stated, the oil seal 73 is used between the relatively rotary hub 64 and shaft 29. Since there is always the possibility of some leakage through such a seal, this leakage is returned to the sump by way of a passage 75, extending from beyond the seal 73 through the parts 64 and 59 and passage 80 to the extension 69 of sump 33.

An oil seal 77 is also used between the stationary member 11 and the rotary hub 64, and to return leakage therefrom, a passage 79 is employed which communicates with said space 69 for return of excess leakage back to the sump 33.

Complete operation is as follows:

A charge of liquid lubricant (oil) is inserted through the cup 39, until a level is reached, according to the gauge glass 37, which by experience is found to be satisfactory. A suitable level is shown.

Rotation of the shaft 15, by contact in the groove 51 with the oil-lift ring 53, rotates the latter in the supply of lubricant in the sump 33. Lubricant is picked up as indicated by the arrows (Fig. 2), and elevated to the groove 51 adjacent the conical surface 49, whence the lubricant centrifugally creeps to the bearing 3 and the excess gathers in the auxiliary stationary sump 55 which is associated with said bearing.

Excess lubricant from the bearing 3 runs out along the incline 63 and spills over the lip 57 and behind flange 61, and thus into the hollow cup formed by the members 21, 59 and 64. Herein the lubricant is centrifugally spun and thereby is held in place to form a cup-like or cylindric pool, the depth of which is determined by the inwardly directed edge at 61. The level of the cylindric pool builds up until the overflow occurs over the spinning edge at 61 and out into the stationary hollow space 80 within which the rim 59 of flange 17 spins. Lubricant that escapes past the seal 73 also returns to space 80 via passage 75. Lubricant that escapes through the seal 77 returns via the passage 79. The passage 79 (and hence also space 80) is open to atmosphere as indicated at 83 in order to break any internal vacuum which might tend to form.

Referring now more particularly to Fig. 4, there is shown the form of the apparatus for application to the construction of said Patent 2,287,953. Corresponding reference characters indicate corresponding parts so far as applicable. The differences are as follows:

Shaft 15 is preferably driven while 29 is the driver. In connection with the endwise oil seal 41, no return for leakage back to the sump 33 is provided for. That is, the parts 43 and 45 of Fig. 1 for return circulation have no counterpart in Fig. 4. Also in Fig. 4, the sealing cup and gauge glass are not shown, being on the other side of the apparatus.

In the apparatus to which Fig. 4 applies there is also used on the shaft 15 a gear 85, through which oil must pass in traveling from the bearing 3 to the inwardly directed flange 95 of the rotary sump. This gear is formed with a groove 89 having an inwardly directed outer lip 62. The groove receives oil from the stationary sump 55 in part over member 58 and in part from a sleeve 87 on shaft 15. In this case, excess lubricant splashed about by bearing 3 flows along the sleeve 87 to the annular recess 89 in the gear 85. The stationary member 58 serves to catch drippings from the sleeve 87 and to lead them also positively into the annular recess 89. Openings 91 through the gear permit travel of lubricant to the left-hand side of the gear, from whence it creeps along the cone 93, also rotary with the shaft 15. The cone 93 in Fig. 4 corresponds to cone 63 in Fig. 1. Oil movement is to an annular pocket behind lip 95 and through openings at 97 forming a connection with rotary sump 99. Elements 95 and 97 in Fig. 4 correspond to elements 61 and 67 in Fig. 1.

The cup or pocket 99 is rotating and thus the oil gathers to feed the outer race 21 of contained bearing 23. The inner race 27 of the bearing 23 is on the shaft 29 which in this case happens to be the driving member. This makes the shaft 15 the driven member and this reversal of driver and driven relationships in Fig. 4 illustrates how the lubricant may flow in either direction between driving and driven members. That is, in Fig. 1, lubricant flow is from 15 which is a driver to the member 29 which is driven, and in Fig. 4 it is from the member 15 acting as the driven member and to member 29 acting as a driver.

The sump formed by the cup-shaped pocket 99 is completed by the flange 101 which rotates with the parts 103, 105, and 107, all organized for rotation with the shaft 15, as indicated by the key 109, stud 111 and welding 113. Thus in this case the rollers 25 form the anti-friction pilot bearing between the shafts 15 and 29 while the bearings 3 form the main supporting bearing.

The inwardly directed flange 101 includes an oil seal 115 in connection with a collar 117 rotary with the shaft 29. The collar 117 and inner race 27 are organized on the shaft 29 by means of a holding nut 119.

Leakage, if any, through the seal 115 passes over a lip 137 and behind a lip 139 to a vacuum breaker passage 121 which discharges over an attached lip 123 into a stationary compartment 125. The leakage is piped out over a line 127 and may return to the sump 33 if this is found to be desirable.

Outside of the lip 95 (see the central portion of Fig. 4) is also an oil seal 129 (corresponding to seal 77 in Fig. 1). Oil which passes this seal proceeds through openings 130 to recess 129 and out over pipe 135 and back to the sump 33. Excess spun from behind the lip 95 proceeds through opening 131 to the sump 33.

Since member 101 has the lip 137 extending into a surrounding lip 139 while the lip 137 rotates with the part 103 and the lip 139 rotates with the shaft 29, therefore oil which leaks through the seal 115 is caught within the lip 139 and prevented from spinning out. It proceeds through passages 121.

Operation of the form of the invention shown in Fig. 4 is as follows:

Lubricant is picked up by the ring 53 from the sump 33 and deposited upon the surface of the cone 49. It moves along the surface of the cone into the bearing 3 and stationary sump 55. The rollers 9 of the bearing 3 move through the lubricant and splash it upon the sleeve 87. The lubricant moves along this sleeve and into the annular pocket or groove 89 which, in view of the lip 62, holds the lubricant in position so that it flows through the openings 91. Lubricant that drips from the sleeve 87 is carried into the pocket 89 by means of the member 58.

After passing through the openings 91, the lubricant creeps by centrifugal action along the cone 93 and behind the circular lip 95. Since the lip 95 is spinning (part 107 is keyed to the shaft 15 by key 109) a head of liquid is built up behind the lip 95 and moves through the passages 97 to the cup-like space 99 around the bearing 23. The member 101 forms a dam beyond the bearing 23.

Due to centrifugal action a cylindric level of liquid is thus built up in the cup 99 until spilling under centrifugal force takes place over the lip 95 and through the passage 131 into the stationary sump 33.

Lubricant that leaks past the seals 101 and 129 flows out over pipes 127 and 135 respectively. The passage 121 also serves as a vacuum breaker.

From the above it will be seen that a generic feature of the invention is, among other things, provision of an oil or lubricant sump located at an exterior point on a stationary part of the machine so that lubricant can conveniently be inserted through a suitable stationary opening. Into this sump dips the lubricant ring which depends from the groove associated with one of the rotary shafts, the ring carrying the lubricant up to the cone which by centrifugal creepage axially feeds the lubricant to the auxiliary stationary sump associated with the supporting bearing in the stationary part of the machine. From this auxiliary stationary bearing sump the lubricant is axially delivered by a spinning cone to a point within a cup revolving on another part, which may be referred to as a centrifugal or rotary sump.

By centrifugal or rotary sump is meant that there is a rotary chamber hollowed out interiorly like a barrel, so that centrifugal force on the inserted lubricant tends to hold the lubricant in place until a certain axial liquid level is attained. A lip on one end and an oil seal at the other end determine the ends of the centrifugal sump. The surface of the liquid in this centrifugal sump is of course more or less cylindric, regardless of detailed local intricacies of the interior barrel shape. After the predetermined axial level is exceeded, as determined by the inwardly directed lips, the lubricant spills radially, and proceeds back to the sump. In addition, all leakage through the seal returns to the sump.

The cylindrical form of the surface around the bearing 23 is of course more perfect the faster shaft 15 revolves, and when this shaft is stationary, all of the lubricant is deposited around the bottom of the bearing, as in the case of bearing 3. The excess returns to the main sump, but in any event, there is always a supply of lubricant in the bearing sumps, when the machinery is stationary and it is thus available at the time of starting.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Lubricating apparatus for relatively rotary members comprising a hollow portion in one of the members on one side of which is an inwardly extending annular lip adapted to predetermine an axial level of lubricant contained in the hollow portion, the other rotary member having a portion extending into the hollow portion, a lubricant seal between said rotary members, a pilot bearing between said rotary members and located axially between said seal and said lip and operative in the rotary sump of lubricant formed in said hollow portion, the first-named rotary member having a conical form extending axially to a region within said lip and adapted to receive lubricant for movement to a position within said cup, said lip constituting one side of the rotary sump.

2. Lubricating apparatus for relatively rotary members comprising a hollow portion in one of the members on one side of which is an inwardly extending annular lip adapted to predetermine the axial level of lubricant contained in the hollow portion, the other rotary member having a portion extending into the hollow portion, a lubricant seal between said rotary members, a pilot bearing between said rotary members and located axially between said lubricant seal and said lip and operative in the centrifugal sump of lubricant formed in said hollow portion, the first-named rotary member having a conical form extending axially to a region within said lip and adapted to receive lubricant for centrifugal movement to a position within said cup, a supporting bearing for the last-named rotary member, a stationary member in which said supporting bearing rotates and forming a stationary sump in which the supporting bearing moves, and means operated by the rotary member which carries the conical portion for pumping lubricant through the last-named bearing and to said conical portion.

3. Lubricating apparatus for relatively rotary members comprising a hollow portion in one of the members on one side of which is an inwardly extending annular lip adapted to predetermine the axial level of lubricant contained in the hollow portion, the other rotary member having a portion extending into the hollow portion, a lubricant seal between said rotary members, a pilot bearing between said rotary members and located axially between said lubricant seal and said lip and operative in the centrifugal sump of lubricant formed in said hollow portion, the first-named rotary member having a conical form extending axially to a region within said lip and adapted to receive lubricant for centrifugal movement to a position within said cup, a supporting bearing for the last-named rotary member, a stationary member in which said supporting bearing rotates and forming a stationary sump in which the supporting bearing moves, and means operated by the rotary member which carries the conical portion for pumping lubricant through the last-named bearing and to said conical portion, said last-named pumping means comprising a grooved cone on the last-named rotary member flaring toward the supporting bearing, and a revolving lubricant lift riding in said groove.

4. Lubricating apparatus comprising a stationary part having a main lubricant sump, a bearing, a rotary part extending into the stationary part and supported by said bearing, revolving lubricant lifting means suspended from said rotary part, a conical surface extending from the lubricant lifting means to said bearing whereby lubricant is forced to the bearing, an auxiliary stationary sump formed in the stationary part through which parts of said bearing move, a lip associated with said sump determining a liquid level therein, excess lubricant flowing from the auxiliary sump past the lip, a hollow cup carried by said rotary part and having an inwardly extending flange within which said lip extends to transfer excess lubricant from the auxiliary sump to the cup, said cup forming a substantially cylindric centrifugal sump for the excess lubricant, a second rotary member extending into said centrifugal sump, and an anti-friction bearing between said rotary members and in said centrifugal sump.

5. Lubricating apparatus comprising a stationary part having a main lubricant sump, a roller bearing therein, a rotary shaft extending into the stationary part and supported by said bearing, revolving lubricant lifting means suspended from said rotary part and dipping into lubricant in the main sump, means extending from the lubricant lifting means to said bearing whereby lubricant is forced to the bearing, an auxiliary stationary sump formed in the stationary part through which the rollers of said bearing move, a rotary cup carried by said shaft and having an inwardly extending flange, means receiving excess lubricant from the auxiliary sump and delivering it within said cup, said cup forming a centrifugal sump for the excess lubricant, a second rotary shaft extending into said centrifugal sump, lubricant sealing means between said shafts and enclosing the centrifugal sump, and an anti-friction bearing between said rotary members and moving within said centrifugal sump.

6. Lubricating apparatus comprising a stationary part having a main lubricant sump, a roller bearing therein, a rotary shaft extending into the stationary part and supported by said bearing, revolving lubricant lifting means suspended from said rotary part and dipping into lubricant in the main sump, means extending from the lubricant lifting means to said bearing whereby lubricant is forced to the bearing, an auxiliary stationary sump formed in the stationary part through which the rollers of said bearing move, a rotary cup carried by said shaft and having an inwardly extending flange, means receiving excess lubricant from the auxiliary sump and delivering it within said cup, said cup forming a centrifugal sump for the excess lubricant, a second rotary shaft extending into said centrifugal sump, lubricant sealing means between said shafts and enclosing the centrifugal sump, an anti-friction bearing between said rotary members and moving within said centrifugal sump, and passages from the centrifugal and auxiliary sumps for carrying excess lubricant back to the main sump.

7. Lubricating apparatus comprising a stationary part forming a main sump, a roller bearing therein, a rotary part extending into the stationary part and supported by said bearing, rotary lubricant lifting means suspended from said rotary part, a conical surface extending from the lubricant lifting means to said bearing whereby lubricant is forced to move to the bearing, an auxiliary stationary sump formed in the stationary part through which parts of said bearing move, a lip associated with said auxiliary sump determining a liquid level therein, excess lubricant flowing from the auxiliary sump over the lip, means for returning some of the excess lubricant to the main sump, a rotary cup carried by said shaft and having an inwardly extending flange within which said lip extends to deliver other excess lubricant from the auxiliary sump, said cup forming a rotary sump for the excess lubricant, a second rotary member extending into said rotary sump, a roller bearing between said rotary members and moving within said rotary sump, excess lubricant from said centrifugal sump moving over the inwardly extending flange, and means for returning said other excess lubricant to the main stationary sump.

8. Lubricating apparatus comprising a stationary part forming a main sump, a roller bearing therein, a rotary part extending into the stationary part and supported by said bearing, rotary lubricant lifting means suspended from said rotary part, a conical surface extending from the lubricant lifting means to said bearing whereby lubricant is forced to move to the bearing, an auxiliary stationary sump formed in the stationary part through which parts of said bearing move, a lip associated with said sump determining a liquid level therein, excess lubricant flowing from the auxiliary sump over the lip, means for returning some of the excess to the main sump, a rotary cup carried by said shaft and having an inwardly extending flange within which said lip extends to deliver excess lubricant from the auxiliary sump, said cup forming a rotary sump for the excess lubricant, a second rotary member extending into said centrifugal sump, an anti-friction bearing between said rotary members and moving within said centrifugal sump, excess lubricant from said centrifugal sump moving centrifugally over the inwardly extending flange, means for returning said lubricant to the main sump, lubricant sealing means between the stationary means and one of the rotary members, lubricant sealing means between the rotary members, and means for removing lubricant which leaks past said lubricant sealing means.

9. In apparatus combining a rotary member carried in an anti-friction bearing which in turn is carried in a stationary member, a second rotary member piloted on an anti-friction pilot bearing in the first rotary member, said stationary member forming a main stationary lubricant sump, a rotary lubricant lifting means suspended from the first rotary member, a conical surface on said first rotary member for centrifugally feeding lubricant from the lift member to the first-named bearing in the stationary member, an auxiliary stationary lubricant sump associated with said first-named bearing carrying a liquid level therein, a lip extending from said auxiliary sump for overflow of lubricant therefrom, a rotary cup carried by one of said rotary members and forming a rotary sump to receive lubricant interiorly from said lip, said second-named shaft extending into the rotary cup and said second-named bearing operating therein.

10. In apparatus combining a rotary member in a bearing carried in a stationary member, and a second rotary member piloted on a pilot bearing in the first rotary member, a stationary lubricant sump, a rotary lubricant lifting means suspended from the first rotary member, a conical surface on said first rotary member for centrifugally feeding lubricant from the lift member to the first-named bearing, an auxiliary stationary lubricant sump associated with said first-named bearing carrying a lubricant level therein, a lip extending from said auxiliary sump for overflow of lubricant therefrom, a rotary cup carried by one of said rotary members and forming a rotary sump to receive lubricant from said lip, said second-named shaft extending into the rotary sump and said second-named bearing operating in said rotary sump, and an inwardly directed lip on said rotary sump predetermining an axial level therein above which lubricant spins from the sump, and means for returning the excess lubricant to the main stationary sump from the rotary and auxiliary sumps.

11. Lubricating apparatus for relatively rotary members each of which rotates comprising a hollow axial barrel portion organized to rotate with one of the members, said barrel portion being formed to predetermine an axial circular pool of lubricant formed by centrifugal force exerted radially in the barrel portion, and a bearing to be lubricated which is located between said relatively rotary members and operating in said circular pool of lubricant, and a rotary conic portion having a smaller diameter outside of the barrel and a larger diameter within the barrel portion, and means for introducing lubricant on said conic portion whereby the lubricant creeps outwardly on the conic portion by centrifugal force and axially into the barrel portion to supply said circular pool.

MARTIN P. WINTHER.